(12) United States Patent
Wegner et al.

(10) Patent No.: US 10,781,338 B2
(45) Date of Patent: Sep. 22, 2020

(54) POLYURETHANE COATING MATERIAL COMPOSITIONS AND USE THEREOF FOR PRODUCING MULTICOAT PAINT SYSTEMS

(71) Applicant: BASF Coatings GmbH, Muenster (DE)

(72) Inventors: Jens Wegner, Havixbeck (DE); Joerg Mueller, Hamm (DE); Berthold Austrup, Nordkirchen (DE)

(73) Assignee: BASF Coatings GmbH, Muenster (DE)

( * ) Notice: Subject to any disclaimer, the term of this patent is extended or adjusted under 35 U.S.C. 154(b) by 162 days.

(21) Appl. No.: 15/736,580

(22) PCT Filed: Jun. 1, 2016

(86) PCT No.: PCT/EP2016/062368
§ 371 (c)(1),
(2) Date: Dec. 14, 2017

(87) PCT Pub. No.: WO2016/202588
PCT Pub. Date: Dec. 22, 2016

(65) Prior Publication Data
US 2019/0359851 A1    Nov. 28, 2019

(30) Foreign Application Priority Data

Jun. 15, 2015    (EP) .................................... 15172102

(51) Int. Cl.
| | | |
|---|---|---|
| C09D 175/14 | (2006.01) | |
| C08G 18/18 | (2006.01) | |
| C08G 18/22 | (2006.01) | |
| C08G 18/62 | (2006.01) | |
| C08G 18/80 | (2006.01) | |

(52) U.S. Cl.
CPC ....... *C09D 175/14* (2013.01); *C08G 18/1883* (2013.01); *C08G 18/222* (2013.01); *C08G 18/227* (2013.01); *C08G 18/6225* (2013.01); *C08G 18/809* (2013.01); *C08G 18/8096* (2013.01)

(58) Field of Classification Search
CPC .............. C09D 175/14; C08G 18/1883; C08G 18/222; C08G 18/227; C08G 18/6225; C08G 18/809; C08G 18/8096
USPC ..................................................... 428/423.1
See application file for complete search history.

(56) References Cited

U.S. PATENT DOCUMENTS

| | | |
|---|---|---|
| 4,598,131 A * | 7/1986 | Prucnal .................. C08G 18/10 525/440.03 |
| 4,772,672 A | 9/1988 | Isozaki et al. |
| 8,808,805 B2 | 8/2014 | Groenewolt et al. |
| 9,090,732 B2 | 7/2015 | Poppe et al. |
| 9,631,112 B2 | 4/2017 | Hoffmann et al. |
| 2003/0158327 A1 | 8/2003 | Han et al. |
| 2011/0045190 A1 | 2/2011 | Groenewolt et al. |
| 2012/0220717 A1 | 8/2012 | Richter et al. |
| 2014/0329098 A1 | 11/2014 | Groenewolt et al. |
| 2015/0210886 A1 | 7/2015 | Hoffmann et al. |
| 2015/0247050 A1 | 9/2015 | Hoffmann et al. |

FOREIGN PATENT DOCUMENTS

| | | |
|---|---|---|
| DE | 101 42 296 C1 | 2/2003 |
| DE | 10 2005 045 228 A1 | 4/2007 |
| EP | 0 692 007 | 1/1996 |
| EP | 0 994 117 A1 | 4/2000 |
| EP | 1 273 640 A2 | 1/2003 |
| EP | 2 493 948 B1 | 10/2013 |
| WO | WO 96/20967 A1 | 7/1996 |
| WO | 01/09260 A1 | 2/2001 |
| WO | 2006/042585 A1 | 4/2006 |
| WO | 2009/077182 A1 | 6/2009 |
| WO | 20091077180 A1 | 6/2009 |
| WO | 2014/016019 A1 | 1/2014 |
| WO | 2014/016026 A1 | 1/2014 |
| WO | 2014/048854 A1 | 4/2014 |
| WO | 2014/048879 A1 | 4/2014 |
| WO | 2014/077180 A1 | 5/2014 |

OTHER PUBLICATIONS

International Search Report dated Jul. 1, 2016, in PCT/EP2016/062368, filed Jun. 1, 2016.
European Search Report dated Nov. 16, 2015 in Patent Application No. 15172102.4 (with English translation of categories of cited documents), 3 pages.
International Search Report dated Jul. 1, 2016 in Patent Application No. PCT/EP2016/062368 (English translation previously filed) 3 pages.
"Römpp Lexikon, Lacke and Druckfarben" Georg Thieme Verlag, 1998, pp. 250-252 and cover pages.
European Opposition dated Feb. 21, 2020 in corresponding European Patent Application No. 16727448.9 (with English Translation), 18 pages.
"Bismuth 2-Ethylhexanoate", Chemical Book, CAS No. 67874-71-9, retrieved on Mar. 2, 2020, 1 page.

(Continued)

*Primary Examiner* — William K Cheung
(74) *Attorney, Agent, or Firm* — Oblon, McClelland, Maier & Neustadt, L.L.P.

(57) ABSTRACT

Disclosed herein is a coating material compositions containing (A) a polyhydroxyl group-containing component, (B) a component (B) having on average at least one isocyanate group and having on average at least one of: at least one hydrolyzable silane group of the formula (I): —NR—(X—SiR"x(OR')3-x), and at least one hydrolyzable silane group of the formula (II): —N(X—SiR"x(OR')3-x)n(X'—SiR"y(OR')3-y)m, (D) a phosphorus and nitrogencontaining catalyst, and a catalyst (Z), wherein: the catalyst (Z) is selected from zinc and bismuth carboxylates, of aluminum, zirconium, titanium and/or boron chelates and/or of inorganic, tin-containing catalysts, and mixtures thereof; and the coating material composition comprises at least one reaction accelerator (R) which is selected from the group of inorganic acids and/or of organic acids and/or of partial esters of the inorganic acids and/or of partial esters of the organic acids. Processes for producing multicoat paint systems, and coatings obtained from the coating material compositions are also disclosed.

16 Claims, No Drawings

(56) References Cited

OTHER PUBLICATIONS

Müller et al."Chapter 1.3.1—2K-Polyurethan-Lacke (2K-PUR)", Lackformulierung and Lackrezeptur, 3rd Edition 2009, pp. 96-109.
"Solutions for Coatings, Inks, Adhesives, Elastomers and Sealants", King Industries, Nov. 2012, 52 pages.

* cited by examiner

POLYURETHANE COATING MATERIAL COMPOSITIONS AND USE THEREOF FOR PRODUCING MULTICOAT PAINT SYSTEMS

This application is a U.S. National Stage Application under 35 U.S.C. § 371 of International Application No. PCT/EP2016/062368 filed on Jun. 01, 2016, and claims benefit to European Patent Application No. EO 15172102.4 filed on Jun. 15, 2015, which are all hereby incorporated in their entirety by reference.

The present invention relates to coating material compositions comprising at least one polyhydroxyl group-containing component (A), at least one component (B) having on average at least one isocyanate group and having an average of at least one hydrolyzable silane group, at least one phosphorus- and nitrogen-containing catalyst (D) for the crosslinking of silane groups, and at least one catalyst (Z) for the reaction of the hydroxyl groups with the isocyanate groups. It also relates to a process for producing multicoat paint systems using these coating material compositions, and also to the multicoat systems producible by means of this process.

PRIOR ART

Coating material compositions based on polyurethanes and also their use as the topmost clearcoat of multicoat paint systems have been known for a long time. Also known is that through the use of polyisocyanate crosslinkers which additionally have hydrolyzable silane groups, it is possible to achieve substantial improvements in the scratch resistance of the resulting multicoat paint systems. Particularly if the coatings are cured at relatively low temperatures of not more than 90° C., as are customarily for automotive refinishing and also for the coating of parts for installation in or on automobiles and of commercial vehicles, the simultaneous crosslinking via the silane groups and the OH/NCO reaction is a very important aspect.

For example, WO 09/077180 describes coating material compositions which comprise polyisocyanate crosslinkers having additional hydrolyzable silane groups and, as catalysts, in particular 1,4-diazabicyclo[2.2.2]octane (DABCO)-blocked bis (2-ethylhexyl) phosphate and which are used in particular for coatings which are cured at low temperatures, more particularly of 30 to 90° C.

WO 09/077182 describes coating material compositions which comprise polyisocyanate crosslinkers having additional hydrolyzable silane groups and, as catalyst, triethylamine-blocked bis(2-ethylhexyl) phosphate, and also, as further catalyst, amines, more particularly bicyclic amines, such as, for example, 1,8-diazabicyclo[5.4.0]undec-7-ene (DBU) or 1,5-diazabicyclo[4.3.0]non-5-ene (DBN).

Still requiring of improvement in both coating materials, however, is the curing of the coating materials at the low baking temperatures of 100° C. at most.

Furthermore, WO 2014/016026 describes coating material compositions which comprise polyisocyanate crosslinkers having additional hydrolyzable silane groups and, as catalyst, 1,4-diazabicyclo[2.2.2]octane (DABCO)-blocked bis(2-ethylhexyl) phosphate, and also, as further catalyst, a monomeric aromatic, optionally substituted, carboxylic acid (S) whose carboxyl group is in conjugation with a π-electron system, more particularly benzoic acid. Deserving of improvement in the case of these coating materials is the chemical resistance, especially the resistance toward sodium hydroxide solution, and also the hardness of the coatings immediately after curing. A reduction in the onset temperature is desirable as well.

WO 2014/077180, finally, describes coating material compositions based on silanized ioscyanate crosslinkers, these compositions comprising zinc amidine complexes as catalyst and, as a further component, at least one aromatic monocarboxylic acid, more particularly benzoic acid. A disadvantage with these coating materials, however, is the yellowing tendency of the catalyst used, especially at elevated temperatures of 60 to 100° C.

Problem

The problem addressed by the present invention was therefore that of eliminating the above-described disadvantages of the prior art. The intention was therefore to provide coating material compositions of the type stated at the introduction that immediately after curing at temperatures of not more than 100° C., more particularly of not more than 90° C., exhibit good packing resistance and good assembly strength on the part of the resultant coatings. The desire is therefore for a very low onset temperature, in other words a very low temperature at which crosslinking begins.

Furthermore, the coating material compositions, even on curing at temperatures of not more 100° C., more particularly of not more than 90° C., ought to ensure not only good hardnesses and scratch resistances on the part of the resultant coating, but also, at the same time, good chemical resistance of the resultant coating.

Additionally, the coating material compositions ought to lead to coatings having extremely low thermal yellowing, especially in the context of the tests customarily in the OEM finishing sector, such as the BMW test, for example, in other words on storage at 100° C. for 7 days. Moreover, they ought also to fulfill the qualities customarily required in the sector of the finishing of commercial vehicles and parts for installation in or on automobiles.

Finally, the coating material compositions used in the process ought to be able to be produced easily and with very good reducibility, and ought not to cause any environmental problems during coating-material application.

Solution to the Problem

Found accordingly have been coating material compositions comprising a) at least one polyhydroxyl group-containing component (A), b) at least one component (B) having on average at least one isocyanate group and having on average
at least one hydrolyzable silane group of the formula (I)

$$-NR-(X-SiR''_x(OR')_{3-x}) \tag{I}$$

and/or at least one hydrolyzable silane group of the formula (II)

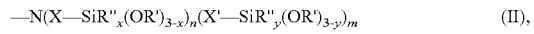
$$-N(X-SiR''_x(OR')_{3-x})_n(X'-SiR''_y(OR')_{3-y})_m \tag{II}$$

where

R=hydrogen, alkyl, cycloalkyl, aryl, or aralkyl, it being possible for the carbon chain to be interrupted by nonadjacent oxygen, sulfur, or NRa groups, where Ra=alkyl, cycloalkyl, aryl, or aralkyl, R'=hydrogen, alkyl, or cycloalkyl, it being possible for the carbon chain to be interrupted by nonadjacent oxygen, sulfur, or NRb groups with Rb=alkyl, cycloalkyl, aryl, or aralkyl, preferably R'=ethyl and/or methyl, X, X'=linear and/or branched alkylene or cycloalkylene radical having 1 to 20 carbon atoms, preferably X, X'=alkylene radical having 1 to 4 carbon atoms, R"=alkyl, cycloalkyl, aryl, or aralkyl, it being possible for the carbon chain to be interrupted by nonadjacent oxygen, sulfur, or NRc groups, with NRc=alkyl, cycloalkyl, aryl, or aralkyl, preferably R"=alkyl radical, more particularly having 1 to 6 C atoms, n=0 to 2, m=0 to 2, m+n=2, and x, y=0 to 2, c) at least one phosphorus and nitrogen-containing catalyst (D) for the crosslinking of silane groups, and d) at least one catalyst (Z) for the reaction of the hydroxyl groups with the isocyanate groups, wherein i. the catalyst (Z) is selected from the group of zinc and bismuth carboxylates, of aluminum, zirconium, titanium and/or boron chelates and/or of inorganic, tin-containing catalysts, and mixtures thereof, and ii. the coating material composition comprises at least one reaction accelerator (R) which is selected from the group of inorganic acids and/or of organic acids and/or of partial esters of the inorganic acids and/or of partial esters of the organic acids.

The present invention further provides processes for producing multicoat paint systems using the coating material compositions, and also the coatings obtainable by this process, and also the use thereof. Preferred embodiments are apparent from the description hereinafter and from the dependent claims.

It is surprising and was not foreseeable that the coatings produced with the coating material compositions of the invention, immediately after curing at temperatures of not more than 100° C., more particularly of not more than 90° C., exhibit good packing resistance and good assembly strength. The coating material compositions of the invention are notably, furthermore, for a low onset temperature, in other words for a low temperature at which crosslinking begins.

Furthermore, even on curing at temperatures of not more than 100° C., more particularly of not more than 90° C., the coating material compositions lead to coatings having good hardness and scratch resistance and also, at the same time, good chemical resistance.

Furthermore, the coating material compositions lead to coatings having extremely low thermal yellowing, especially in the context of the tests customarily in the sector of OEM finishing, such as the BMW test, for example, in other words on storage at 100° C. for 7 days. They also, moreover, realize the properties customarily required within the sector of the finishing of commercial vehicles and of parts for installation in or on automobiles.

Lastly, the coating material compositions can be produced easily and very reproducibly, and do not give rise to any environmental problems during the coating-material application.

DESCRIPTION OF THE INVENTION

The Inventively Employed Coating Materials

For the purposes of the present invention, constant conditions were selected in each case, and thus unless otherwise specified, for determining nonvolatile fractions (nfA, also called solids content or binder content).

To determine the nonvolatile fraction of the individual components (A) or (B) or (C) or (E) of the coating material, an amount of 1 g of the respective sample of the respective component (A) or (B) or (C) or (E) is applied to a solids-content lid and is heated at 130° C. for 1 h, then cooled to room temperature and weighed again (in accordance with ISO 3251). The binder content of the component in wt % is then obtained correspondingly from 100 multiplied by the ratio of the weight of the residue of the respective sample after drying at 130° C. divided by the weight of the respective sample prior to drying. The nonvolatile fraction was determined, for example, for corresponding polymer solutions or resins present in the coating composition of the invention, in order thereby to be able to adjust and determine the weight fraction of the respective constituent in a mixture of two or more constituents or in the coating composition as a whole. In the case of commercial components, the binder content of this component may also be equated with sufficient accuracy with the stated solids content, unless otherwise indicated.

The binder content of the coating material composition is in each case the total binder content of components (A) plus (B) plus (C) plus (E) of the coating material composition prior to crosslinking. It is calculated, in a manner known to the skilled person, from the binder fraction of these components (A) or (B) or (C) or (E) and the amount of the respective component (A) or (B) or (C) or (E) that is used in each case in 100 parts by weight of the coating material composition: the binder content of the coating material composition in parts by weight is therefore equal to the sum of the products of the amount of the respective component (A) or (B) or (C) or (E) used in each case in 100 parts by weight of the coating material composition, in each case multiplied by the binder content of the respective component (A) or (B) or (C) or (E) in wt %, and divided in each case by 100.

For the purposes of the invention, the hydroxyl number or OH number indicates the amount of potassium hydroxide, in milligrams, which is equivalent to the molar amount of acetic acid bound during acetylation of one gram of the constituent in question. For the purposes of the present invention, unless otherwise indicated, the hydroxyl number is determined experimentally by titration in accordance with DIN 53240-2: 2007-11 (Determination of hydroxyl value—Part 2: Method with catalyst).

For the purposes of the invention, the acid number indicates the amount of potassium hydroxide, in 15 milligrams, which is needed to neutralize 1 g of the respective constituent. For the purposes of the present invention, unless indicated otherwise, the acid number is determined experimentally by titration in accordance with DIN EN ISO 2114: 2006-11.

The mass-average (Mw) and number-average (Mn) molecular weight is determined for the purposes of the present invention by means of gel permeation chromatography at 35° C., using a high-pressure liquid chromatography pump and a refractive index detector. The eluent used was tetrahydrofuran containing 0.1 vol % acetic acid, with an elution rate of 1 ml/min. The calibration is carried out using polystyrene standards.

For the purposes of the invention, the glass transition temperature, Tg, is determined experimentally on the basis of DIN 51005 "Thermal Analysis (TA)—Terms" and DIN EN ISO 11357-2 "Thermal analysis—Dynamic Scanning Calorimetry (DSC)". This involves weighing out a 10 mg sample into a sample boat and introducing it into a DSC instrument. The instrument is cooled to the start temperature, after which a $1^{st}$ and $2^{nd}$ measurement run is carried out under inert gas flushing (N2) at 50 ml/min with a heating rate of 10 K/min, with cooling to the start temperature again between the measurement runs. Measurement takes place customarily in the temperature range from about 50° C. lower than the anticipated glass transition temperature to about 50° C. higher than the glass transition temperature. The glass transition temperature recorded for the purposes of the present invention, in line with DIN EN ISO 11357-2, section 10.1.2, is the temperature in the $2^{nd}$ measurement run at which half of the change in the specific heat capacity (0.5 delta cp) is reached. This temperature is determined from the DSC diagram (plot of the flow against the temperature), and is the temperature at the point of intersection of the midline between the extrapolated base lines, before and after the glass transition, with the measurement plot.

The Polyhydroxyl Group-containing Component (A)

As polyhydroxyl group-containing component (A) it is possible to use all compounds known to the skilled person which have at least 2 hydroxyl groups per molecule and are oligomeric and/or polymeric. As component (A) it is also possible to use mixtures of different oligomeric and/or polymeric polyols.

The preferred oligomeric and/or polymeric polyols (A) have number-average molecular weights Mn >=300 g/mol, preferably Mn=400-30 000 g/mol, more preferably Mn=500-15 000 g/mol, and mass-average molecular weights Mw >500 g/mol, preferably between 800 and 100 000 g/mol, more particularly between 900 and 50 000 g/mol, as measured by gel permeation chromatography (GPC) against a polystyrene standard.

Preferred as component (A) are polyester polyols, polyacrylate polyols and/or polymethacrylate polyols, and also copolymers thereof—referred to below as polyacrylate polyols; and polyurethane polyols, polysiloxane polyols, and mixtures of these polyols.

The polyols (A) preferably have an OH number of 30 to 400 mg KOH/g, more particularly between 70 and 250 mg KOH/g. In the case of the poly(meth)acrylate copolymers, the OH number may also be determined with sufficient accuracy by calculation on the basis of the OH-functional monomers used.

The polyols (A) preferably have an acid number of between 0 and 30 mg KOH/g.

The glass transition of the polyols; temperatures, in each case measured by means of differential scanning calorimetry (DSC) to DIN 53765 are preferably between −150 and 100° C., more preferably between −40° C. and 60° C.

Polyurethane polyols are prepared preferably by reaction of oligomeric polyols, more particularly of polyester polyol prepolymers, with suitable di- or polyisocyanates, and are described in EP-A-1 273 640, for example. Used in particular are reaction products of polyester polyols with aliphatic and/or cycloaliphatic di- and/or polyisocyanates.

The polyurethane polyols used with preference in accordance with the invention have a number-average molecular weight Mn >=300 g/mol, preferably Mn=700-2000 g/mol, more preferably Mn=700-1300 g/mol, and also, preferably, a mass-average molecular weight Mw >500 g/mol, preferably between 1500 and 3000 g/mol, more particularly between 1500 and 2700 g/mol, in each case measured by gel permeation chromatography (GPC) against a polystyrene standard.

Suitable polysiloxane polyols are described in WO-A-01/09260, for example, and the polysiloxane polyols recited therein can be employed preferably in combination with further polyols, especially those with relatively high glass transition temperatures.

Polyhydroxyl group-containing components (A) used with particular preference are polyester polyols, polyacrylate polyols, polymethacrylate polyols, polyurethane polyols, or mixtures thereof, and very preferably mixtures of poly(meth)acrylate polyols.

The polyester polyols (A) that are used with preference in accordance with the invention have a number-average molecular weight Mn >=300 g/mol, preferably Mn=400-10 000 g/mol, more preferably Mn=500-5000 g/mol, and also, preferably, a mass-average molecular weight Mw >500 g/mol, more preferably between 800 and 50 000 g/mol, more particularly between 900 and 10 000 g/mol, measured in each case by gel permeation chromatography (GPC) against a polystyrene standard.

The polyester polyols (A) used with preference in accordance with the invention preferably have an OH number of 30 to 400 mg KOH/g, more particularly between 100 and 250 mg KOH/g.

The polyester polyols (A) used with preference in accordance with the invention preferably have an acid number of between 0 and 30 mg KOH/g.

Suitable polyester polyols are also described in EP-A-0 994 117 and EP-A-1 273 640, for example.

The poly(meth)acrylate polyols (A) used with preference in accordance with the invention are generally copolymers and preferably have a number-average molecular weight Mn >=300 g/mol, preferably Mn=500-15 000 g/mol, more preferably Mn=900-10 000 g/mol, and also, preferably, mass-average molecular weights Mw of between 500 and 20 000 g/mol, more particularly between 1000 and 15 000 g/mol, measured in each case by gel permeation chromatography (GPC) against a polystyrene standard.

The poly(meth)acrylate polyols (A) preferably have an OH number of 60 to 300 mg KOH/g, more particularly between 70 and 250 mg KOH/g, and also an acid number of between 0 and 30 mg KOH/g.

The hydroxyl number (OH number) and the acid number are determined as described above (DIN 53240-2 and DIN EN ISO 2114, respectively).

Monomer units suitable for the poly(meth)acrylate polyols (A) used with preference in accordance with the invention are identified, for example, in WO2014/016019 on pages 10 and 11 and also in WO2014/016026 on pages 11 and 12.

Used in particular in accordance with the invention are coating material compositions (K) which comprise as component (A) one or more poly(meth)acrylate polyols (A1) having a glass transition temperature of between −100 and <30° C., preferably below 10° C., more particularly between −60° C. to +5° C., and more preferably between −30° C. and <0° C. (measured by differential scanning calorimetry (DSC) to DIN 53765). Additionally the coating material compositions (K) may further comprise one or more different poly(meth)acrylate polyols (A2), preferably poly(meth)acrylate polyols (A2) which have a glass transition temperature of 10 to 50° C. (differential scanning calorimetry (DSC) to DIN 53765). The glass transition temperature may initially also be estimated theoretically by the skilled person with the aid of the Fox equation (III) below, but is then to be determined experimentally as described above:

$$1/T_g = \sum_{n=1}^{n=x} W_n/T_{gn} \quad \text{(III)}$$

where $T_g$=glass transition temperature of the polyacrylate or polymethacrylate, x=number of different copolymerized monomers, $W_n$=weight fraction of the nth monomer, $T_{gn}$=glass transition temperature of the homopolymer of the nth monomer.

The component (A) preferably comprises at least one (meth)acrylate copolymer which is obtainable by copolymerizing (a) 10 to 80 wt %, preferably 20 to 50 wt %, of a hydroxyl-containing ester of acrylic acid or mixtures of these monomers,
(b) 0 to 30 wt %, preferably 0 to 15 wt %, of a non-(a) hydroxyl-containing ester of methacrylic acid or of a mixture of such monomers,
(c) 5 to 90 wt %, preferably 20 to 70 wt %, of a non-(a) and non-(b) aliphatic or cycloaliphatic ester of (meth)acrylic acid having at least 4 carbon atoms in the alcohol residue, or of a mixture of such monomers,
(d) 0 to 5 wt %, preferably 0.5 to 3.5 wt %, of an ethylenically unsaturated carboxylic acid or of a mixture of ethylenically unsaturated carboxylic acids,
(e) 0 to 50 wt %, preferably 0 to 20 wt %, of a vinylaromatic or of a mixture of such monomers, and
(f) 0 to 50 wt %, preferably 0 to 35 wt %, of an ethylenically unsaturated monomer other than (a), (b), (c), (d), and (e), or of a mixture of such monomers, the sum of the weight fractions of components (a), (b), (c), (d), (e), and (f) always making 100 wt %, and also optionally one or more (meth)acrylate copolymers different therefrom.

Component (B)

The coating materials of the invention comprise a component (B) having on average at least one isocyanate group and having on average at least one hydrolyzable silane group. The coating materials of the invention preferably comprise a component (B) having on average at least one free isocyanate group.

The di- and/or polyisocyanates that serve as parent structures for the component (B) used with preference in accordance with the invention are preferably conventional substituted or unsubstituted aromatic, aliphatic, cycloaliphatic and/or heterocyclic polyisocyanates, more preferably aliphatic and/or cycloaliphatic polyisocyanates. Additionally preferred are the polyisocyanate parent structures derived from an aliphatic and/or cycloaliphatic diisocyanate of this kind by dimerization, trimerization, biuret formation, uretdione formation, allophanate formation and/or isocyanurate formation.

The di- and/or polyisocyanates serving as parent structures for the component (B) used with preference in accordance with the invention are described for example in WO2014/016019 on pages 12 and 13 and also in WO2014/016026 on pages 13 and 14.

Di- and/or polyisocyanates serving with particular preference as parent structures for the component (B) used with preference in accordance with the invention are hexamethylene 1,6-diisocyanate, isophorone diisocyanate, and 4,4'-methylenedicyclohexyl diisocyanate, or mixtures of these isocyanates, and/or one or more polyisocyanate parent structures derived from such an isocyanate by dimerization, trimerization, biuret formation, uretdione formation, allophanate formation and/or isocyanurate formation. More particularly the polyisocyanate parent structure is 1,6-hexamethylene diisocyanate, 1,6-hexamethylene diisocyanate isocyanurate, 1,6-hexamethylene diisocyanate uretdione, isophorone diisocyanate, isophorone diisocyanate isocyanurate, or a mixture of two or more of these polyisocyanates, more preferably 1,6-hexamethylene diisocyanate isocyanurate.

In a further embodiment of the invention, the di- and/or polyisocyanates that serve as parent structures for the component (B) used with preference in accordance with the invention are polyisocyanate prepolymers with urethane structural units, which are obtained by reaction of polyols with a stoichiometric excess of aforesaid polyisocyanates. Polyisocyanate prepolymers of this kind are described for example in U.S. Pat. No. 4,598,131.

Component (B) comprises on average at least one isocyanate group and also, additionally, on average at least one structural unit (I) of the formula (I)

and/or
at least one structural unit (II) of the formula (II)

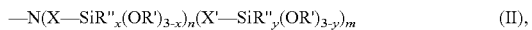

where
R=hydrogen, alkyl, cycloalkyl, aryl, or aralkyl, it being possible for the carbon chain to be interrupted by nonadjacent oxygen, sulfur, or NRa groups, with Ra=alkyl, cycloalkyl, aryl or aralkyl,
R'=hydrogen, alkyl, or cycloalkyl, it being possible for the carbon chain to be interrupted by nonadjacent oxygen, sulfur, or NRb groups, with Rb=alkyl, cycloalkyl, aryl or aralkyl, preferably R'=ethyl and/or methyl,
X, X'=linear and/or branched alkylene or cycloalkylene radical having 1 to 20 carbon atoms, preferably X, X'=alkylene radical having 1 to 4 carbon atoms,
R''=alkyl, cycloalkyl, aryl, or aralkyl, it being possible for the carbon chain to be interrupted by nonadjacent oxygen, sulfur, or NRc groups, with Rc=alkyl, cycloalkyl, aryl or aralkyl, preferably R''=alkyl radical, more particularly having 1 to 6 C atoms,
n=0 to 2, m=0 to 2, m+n=2, and x, y=0 to 2.

Preferably, additionally, component (B) comprises has on average at least one isocyanate group and also on average at least one structural unit (I) of the formula (I) and on average at least one structural unit (II) of the formula (II).

The respective preferred alkoxy radicals (OR') may be alike or different; critical for the construction of the radicals, however, is the extent to which they influence the reactivity of the hydrolyzable silane groups. Preferably R' is an alkyl radical, more particularly having 1 to 6 C atoms. Particularly preferred radicals R' are those which raise the reactivity of the silane groups, i.e., which represent good leaving groups. A methoxy radical is therefore preferred over an ethoxy radical, which is preferred in turn over a propoxy radical. With particular preference, therefore, R'=ethyl and/or methyl, more particularly methyl.

The reactivity of organofunctional silanes may also be considerably influenced, furthermore, by the length of the spacers X, X' between silane functionality and organic functional group serving for reaction with the constituent to be modified. Exemplary of this are the "alpha"-silanes, which are available from Wacker and in which there is a methylene group between Si atom and functional group, rather than the propylene group present in the case of "gamma"-silanes.

Component (B) as preferably employed consists generally of a mixture of different compounds and has only on average at least one structural unit (I) of the formula (I), and/or at least one structural unit (II) of the formula (II), and on average at least one, preferably more than one, isocyanate group. Very preferably, component (B) has on average at least one structural unit (I) of the formula (I) and at least one structural unit (II) of the formula (II), and on average more than one isocyanate group.

The component (B) consists more particularly of a mixture of at least one compound (B1) having more than one isocyanate group and no structural units (I) and (II), with at least one compound (B2) which has at least one isocyanate group and at least one structural unit (I), and with at least one compound (B3) which has at least one isocyanate group and at least one structural unit (II), and/or with at least one compound (B4) which has at least one structural unit (I) and at least one structural unit (II), and/or with at least one compound (B5) which has at least one isocyanate group and at least one structural unit (I) and at least one structural unit (II).

The components (B) used with preference in accordance with the invention and functionalized with the structural units (I) and/or (II) are obtained in particular by reaction of—preferably aliphatic—di and/or polyisocyanates, and/or the polyisocyanates derived therefrom by trimerization, dimerization, urethane formation, biuret formation, uretdione formation and/or allophanate formation, with at least one compound of the formula (Ia)

$$H-NR-(X-SiR''_x(OR')_{3-x}) \quad (Ia),$$

and/or with at least one compound of the formula (IIa)

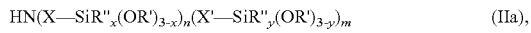

$$HN(X-SiR''_x(OR')_{3-x})_n(X'-SiR''_y(OR')_{3-y})_m \quad (IIa),$$

the substituents having the definition stated above.

The component (B) used with particular preference in accordance with the invention and functionalized with the structural units (I) and (II) is obtained correspondingly by reaction of polyisocyanates with at least one compound of the formula (Ia) and with at least one compound of the formula (IIa).

In this context it is possible, for the preparation of component (B), to react directly the total amount of the di- and/or polyisocyanate used in preparing component (B) with the mixture of at least one compound (Ia) and at least one compound (IIa). Furthermore, to prepare component (B), it is also possible to react the total amount of the di- and/or polyisocyanate used in preparing component (B) first with at least one compound (Ia) and thereafter with at least one compound (IIa).

Furthermore, for preparing component (B), it is possible first to react only part of the total amount of the di- and/or polyisocyanate used in preparing component (B) with the mixture of at least one compound (Ia) and at least one compound (IIa), and subsequently to add the remaining part of the total amount of the di- and/or polyisocyanate used in preparing component (B).

Lastly, for preparing component (B), it is possible first to react only part of the total amount of the di- and/or polyisocyanate used in preparing component (B) separately with at least one compound (Ia), and to react another part of the total amount of the di- and/or polyisocyanate used in preparing component (B) separately with at least one compound (IIa), and optionally, subsequently, to add any remaining residual part of the total amount of the di- and/or polyisocyanate used in preparing component (B). It will be appreciated here that all conceivable hybrid forms of the stated reactions are possible for the preparation of component (B).

Preferably, however, component (B) is prepared by alternatively reacting the total amount of the di- and/or polyisocyanate used in preparing component (B) with the mixture of at least one compound (Ia) and at least one compound (IIa)

or mixing a part of the total amount of the di- and/or polyisocyanate used in preparing component (B) with a component which has been fully silanized with the compounds (Ia) and (IIa) and is therefore free of isocyanate groups and/or mixing a part of the total amount of the di- and/or polyisocyanate used in preparing component (B) with a component (I) which has been fully silanized with the compound (Ia) and is therefore free of isocyanate groups, and with a component (II) which has been fully silanized with the compound (IIa) and is therefore free of isocyanate groups.

Inventively preferred compounds (IIa) are bis(2-ethyltrimethoxysilyl)amine, bis(3-propyltrimethoxysilyl)amine, bis(4-butyltrimethoxysilyl)amine, bis(2-ethyltriethoxysilyl)amine, bis(3-propyltriethoxysilyl)amine and/or bis(4-butyltriethoxysilyl)amine. Especially preferred is bis(3-propyltrimethoxysilyl)amine. Aminosilanes of this kind are available for example under the brand name DYNASYLAN® from Evonik or Silquest® from OSI.

Inventively preferred compounds (Ia) are aminoalkyltrialkoxysilanes, such as preferably 2-aminoethyltrimethoxysilane, 2-aminoethyltriethoxysilane, 3-aminopropyltrimethoxy-silane, 3-aminopropyltriethoxysilane, 4-aminobutyltrimethoxysilane, 4-aminobutyltri-ethoxysilane. Particularly preferred compounds (Ia) are N-(2-(trimethoxysilyl)ethyl)alkylamines, N-(3-(tri-methoxysilyl)propyl)alkylamines, N-(4-(trimethoxysil-yl)butyl)alkylamines, N-(2-(triethoxysilyl)ethyl)alkylamines, N-(3-(triethoxysilyl)propyl)alkylamines and/or N-(4-(triethoxysilyl)butyl)alkylamines. Especially preferred is N-(3-(trimethoxysilyl)propyl)butylamine. Aminosilanes of this kind are available for example under the brand name DYNASYLAN® from Evonik or Silquest® from OSI.

In component (B) preferably between 5 and 75 mol %, more particularly between 10 and 60 mol %, preferably between 15 and 50 mol %, of the isocyanate groups originally present have undergone reaction to form structural units (I) and/or (II), preferably to form structural units (I) and (II).

In component (B), in particular the total amount of bissilane structural units (II) is between 5 and 100 mol %, preferably between 10 and 98 mol %, more preferably between 20 and 90 mol %, very preferably between 30 and 80 mol %, based in each case on the entirety of the structural units (I) plus (II), and the total amount of monosilane structural units (I) is between 95 and 0 mol %, preferably between 90 and 2 mol %, more preferably between 80 and 10 mol %, more preferably between 70 and 20 mol %, based in each case on the entirety of the structural units (I) plus (II).

In component (B), more preferably, between 5 and 55 mol %, preferably between 9.8 and 50 mol %, more preferably 13.5 and 45 mol % of the isocyanate groups originally present have undergone reaction to form bissilane structural units of the formula (II).

The Hydroxyl Group-containing Component (C)

Optionally, as well as the polyhydroxyl group-containing component (A), the coating material compositions of the invention may comprise one or more monomeric, hydroxyl group-containing components (C) that are different from component (A). These components (C) preferably occupy a fraction of 0 to 10 wt %, more preferably of 0 to 5 wt %, based in each case on the binder content of the coating material composition.

Low molecular mass polyols, especially diols, are used as hydroxyl group-containing component (C). Examples of suitable polyols (C) are described in WO 2014/016019 on page 12 and also in WO 2014/016026 on page 13. Low molecular means polyols (C) of this kind are preferably admitted in minor amounts to the polyol component (A).

The Catalyst (D)

It is essential to the invention that phosphorus- and nitrogen-containing catalysts are used as catalyst (D). Mixtures of two or more different catalysts (D) may also be used here.

Examples of suitable phosphorus- and nitrogen-containing catalysts (D) are the amine adducts of optionally substituted phosphonic diesters and optionally substituted diphosphonic diesters, preferably from the group consisting of amine adducts of optionally substituted acyclic phosphonic diesters, or optionally substituted cyclic phosphonic diesters, of optionally substituted acyclic diphosphonic diesters, and of optionally substituted cyclic diphosphonic diesters. Catalysts of these kinds are described for example in German patent application DE-A-102005045228.

Used in particular, however, are amine adducts of optionally substituted phosphoric monoesters and/or amine adducts of optionally substituted phosphonic diesters, preferably from the group consisting of amine adducts of acyclic phosphoric monoesters and diesters and of cyclic phosphoric monoesters and diesters.

Especially preferred for use as catalyst (D) are amine-blocked ethylhexyl phosphates and amine-blocked phenyl phosphates, very preferably amine-blocked bis(2-ethylhexyl) phosphate.

Examples of amines with which the phosphoric esters are blocked are, in particular, tertiary amines, examples being bicyclic amines, such as diazabicyclooctane (DABCO), diazabicyclononene (DBN), diazabicycloundecene (DBU), and/or aliphatic triamines, more particularly dimethyldodecylamine or triethylamine, for example. With preference the phosphoric esters are blocked using tertiary amines which ensure high activity of the catalyst under the curing conditions. Used with very particular preference, especially at low curing temperatures of not more than 90° C., to block the phosphoric esters are bicyclic amines, especially diazabicyclo[2.2.2]octane (DABCO), and/or triethylamine.

Especially preferred for use as catalyst (D) diazobicyclo[2.2.2]octane-blocked ethylhexyl phosphates.

Certain amine-blocked phosphoric acid catalysts are also available commercially (e.g., Nacure products from King Industries).

The catalyst (D) or—if a mixture of two or more catalysts (D) is used—the catalysts (D) are used preferably in fractions of 0.1 to 15 wt %, more preferably in fractions of 0.5 to 10.0 wt %, very preferably in fractions of 0.75 to 8.0 wt %, based on the binder content of the coating material composition. A lower activity on the part of the catalyst may be partly compensated by correspondingly higher quantities employed.

The Catalyst (Z)

It is essential to the invention that the coating material composition (K) additionally further comprises at least one catalyst (Z), different from the accelerator (R) and from the catalyst (D), for the reaction of the hydroxyl groups with the isocyanate groups.

The catalyst (Z) for the reaction between the hydroxyl groups of component (A) and the isocyanate groups of component (B) is selected from the group of zinc carboxylates and bismuth carboxylates and also of aluminum, zirconium, titanium and/or boron chelates, and/or of inorganic, tin-containing catalysts, and of mixtures thereof.

Suitable more particularly as organic, tin-containing catalysts (Z) are tin compounds that contain no tin-carbon bonds, but instead contain only carbon atoms bonded via heteroatoms, more particularly by oxygen, sulfur, or nitrogen, preferably via oxygen.

Particularly preferred as inorganic, tin-containing catalysts (Z) are cyclic tin(IV) compounds having alkyl radicals and/or cycloalkyl radicals and/or aryl radicals and/or arylalkyl radicals bonded exclusively via oxygen atoms and/or nitrogen atoms and/or sulfur atoms, more particularly via oxygen atoms.

Inorganic, tin-containing catalysts (Z) are described for example in WO 2014/048879, page 4, line 20 to page 10, line 34, and page 15, line 1, to page 16, table 1, and also in WO 2014/048854, page 2, line 32, to page 9, line 15, and page 14, line 1 to page 15, table 1, and in EP-B1-2 493 948, page 2, line 53, to page 6, line 54, and page 9, catalyst 4 to 8, and page 10, catalyst 10.

Catalysts (Z) based on aluminum, zirconium, titanium and/or boron chelates are known and are described for example in WO06/042585, page 10, lines 4 to 21. The compounds which form chelate ligands are organic compounds having at least two functional groups which are able to coordinate to metal atoms or metal ions. These functional groups are usually electron donors, which give up electrons to metal atoms or metal ions as electron acceptors. Suitable in principle are all organic compounds of the stated type, provided they do not deleteriously influence, let alone completely prevent, the crosslinking of the coating material compositions. Use may be made as catalysts, for example, of the aluminum chelate and zirconium chelate complexes, as described for example in the American patent U.S. Pat. No. 4,772,672 A, column 8, line 1, to column 9, line 49. Preference is given to aluminum and/or zirconium and/or titanium chelates, such as aluminum ethyl acetoacetate and/or zirconium ethyl acetoacetate, for example.

Catalysts (Z) based on the zinc and bismuth carboxylates are likewise known. Used in particular as catalysts (Z) are zinc(II) biscarboxylates and bismuth(III) triscarboxylates in which the carboxylate radical is selected from the group of carboxylate radicals of aliphatic linear and/or branched, optionally substituted monocarboxylic acids having 1 to 24 C atoms in the alkyl radical, and/or of aromatic, optionally substituted monocarboxylic acids having 6 to 12 C atoms in the aryl radical. The carboxylate radical largely determines the solubility of the resulting catalyst in the coating components used. Examples of suitable catalysts (Z) include the Zn(II) and Bi(III) salts of acetic acid and of formic acid.

Used with particular preference as catalyst (Z) are the Bi(III) salts of branched fatty acids, and especially the Bi(III) salts of branched C3 to C24 fatty acids, preferably branched C4 to C20 fatty acids, more preferably branched C6 to C16 fatty acids, and very preferably from the group of octanoic acids, especially 2-ethylhexanoic acid, and of decanoic acids, especially neodecanoic acid. Especially preferred for use as catalyst (Z) is the Bi(III) salt of branched C3 to C24 fatty acids. The Bi(III) salt of branched fatty acids here may also be present in the form of a polynuclear complex.

Certain Zn(II) and Bi(III) salts of branched fatty acids are also available commercially (e.g., Borchi® Kat products from Lanxess Corp. and K-Kat® products from King Industries). Mention may be made, for example, as particularly suitable catalysts (Z), of those under the name Coscat® 83 from C.H. Erbslöh GmbH & Co. KG, based on bismuth trisneodecanoate; under the name Borchi® Kat 24 from Lanxess Corp., based on bismuth carboxylate; under the name K-Kat® 348 from King Industries, based on bismuth carboxylate; and under the name K-Kat® XC-8203 from King Industries, likewise based on bismuth carboxylate.

The catalyst (Z) or—if a mixture of two or more catalysts (Z) is used—the catalysts (Z) are used preferably in fractions of 0.005 to 1.0 wt %, more preferably in fractions of 0.02 to 0.75 wt %, very preferably in fractions of 0.05 to 0.5 wt %, based on the binder content of the coating material composition. A lower activity on the part of the catalyst here can be partly compensated by correspondingly higher quantities employed.

The Accelerator (R)

Especially if the inventively employed coating material compositions are cured at relatively low temperatures of up to 100° C., it is essential to the invention that the coating material compositions include at least one accelerator (R). Accelerators (R) used may be any components that are different from the catalyst (D) and the catalyst (Z) and that accelerate the reaction of the isocyanate groups of component (B) with the hydroxyl groups of component (A) and optionally (C), and/or accelerate the reaction of the alkoxysilane groups. Especially suitable as accelerators (R) are inorganic acids and/or organic acids and/or partial esters of inorganic acids and/or partial esters of organic acids. Acids used are, in particular, sulfonic acids, such as dodecylbenzenesulfonic acid and toluenesulfonic acid, monomeric aromatic carboxylic acids, such as benzoic acid, tert-butylbenzoic acid, 3,4-dihydroxybenzoic acid, salicylic acid and/or acetylsalicylic acid, for example, especially benzoic acid, alkylphosphonic acids, dialkylphosphinic acids, phosphonic acid, diphosphonic acid, phosphoric acid, partial esters of phosphoric acid, and the like.

Preferred for use as accelerators (R) are phosphorus-containing acids and/or partial esters of phosphorus-containing acids, such as, for example, alkylphosphonic acids, dialkylphosphinic acids, phosphonic acid, diphosphonic acid, phosphinic acid, optionally substituted acyclic phosphoric monoesters and/or optionally substituted cyclic phosphoric monoesters and/or optionally substituted acyclic phosphoric diesters and/or optionally substituted acyclic phosphoric diesters.

Particularly preferred for use are optionally substituted acyclic phosphoric monoesters and/or optionally substituted cyclic phosphoric monoesters and/or optionally substituted acyclic phosphoric diesters and/or optionally substituted acyclic phosphoric diesters, especially acyclic phosphoric diesters and cyclic phosphoric diesters. Use is made here more particularly of partial esters (R) of phosphoric acid, of the general formula (V):

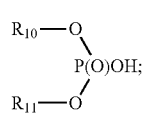

(V)

where the radicals $R_{10}$ and $R_{11}$ are selected from the group consisting of:
  substituted and unsubstituted alkyl having 1 to 20, preferably 2 to 16, and more particularly 2 to 10 carbon atoms, cycloalkyl having 3 to 20, preferably 3 to 16, and more particularly 3 to 10 carbon atoms, and aryl having 5 to 20, preferably 6 to 14, and more particularly 6 to 10 carbon atoms,
  substituted and unsubstituted alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, and cycloalkylarylalkyl, where the alkyl, cycloalkyl, and aryl groups present therein each contain the number of carbon atoms set out above, and
  substituted and unsubstituted radical of the aforementioned kind, comprising at least one, more particularly one, heteroatom selected from the group consisting of oxygen atom, sulfur atom, nitrogen atom, phosphorus atom, and silicon atom, more particularly oxygen atom, sulfur atom, and nitrogen atom, and additionally one of the radicals, $R_{10}$ or $R_{11}$, may also be hydrogen.

Especially preferred for use are partial esters (R) of phosphoric acid, of the general formula (V), in which the radicals $R_{10}$ and $R_{11}$ are selected from the group consisting of substituted and unsubstituted alkyl having 1 to 20, preferably 2 to 16, and more particularly 2 to 10 carbon atoms, cycloalkyl having 3 to 20, preferably 3 to 16, and more particularly 3 to 10 carbon atoms, and aryl having 5 to 20, preferably 6 to 14, and more particularly 6 to 10 carbon atoms, and especially bis(2-ethylhexyl) phosphate and/or bisphenyl phosphate.

The accelerator (R) or—if a mixture of 2 or more accelerators (R) is used—the accelerators (R) are used preferably in fractions of 0.05 to 10.0 wt %, more preferably in fractions of 0.1 to 5.0 wt %, very preferably in fractions of 0.5 to 2.5 wt %, based on the binder content of the coating material composition.

Catalyst (D), catalyst (Z), and accelerators (R) are used in the coating material compositions of the invention more particularly in amounts such that the total amount of catalyst (D) plus catalyst (Z) plus accelerator (R) is between 0.2 and 21 wt %, preferably between 0.6 and 11 wt %, and more preferably between 1.1 and 8.1 wt %, based in each case on the binder content of the coating material composition.

Especially preferred coating material compositions are those in which
i. the phosphorus- and nitrogen-containing catalyst (D) is selected from the group of the adducts of diazabicyclo [2.2.2]octane, dimethyldodecylamine and/or triethylamine with acyclic phosphoric monoesters, with cyclic phosphoric monoesters, with acyclic phosphoric diesters and/or with cyclic phosphoric diesters,
ii. the catalyst (Z) is selected from the group of the Bi(III) salts of branched C3 to C24 fatty acids, and
iii. the reaction accelerator (R) is selected from the group of acyclic phosphoric diesters and of cyclic phosphoric diesters.

The Combination of Components (A), (B), Optionally (C), (D), (Z), (R), and Further Components of the Coating Material Compositions For the 2-component (2K) coating material compositions that are particularly preferred in accordance with the invention, a film-forming component, comprising the polyhydroxyl group-containing component (A) and also further components described below, is mixed in a conventional way with a further film-forming component, comprising the isocyanate group-combining component (B) and also, optionally, further of the components described below, this mixing taking place shortly before the coating material is applied; here, generally, the film-forming component which comprises component (A) comprises the catalyst (D), the catalyst (Z), and the accelerator (R) and also a part of the solvent.

The polyhydroxyl group-containing component (A) may be present in a suitable solvent. Suitable solvents are those which allow sufficient solubility of the polyhydroxyl group-containing component.

Besides components (A), (B), and optionally (C), there may also be further binders (E) used, which are able to react and form network nodes preferably with the hydroxyl groups of the poly(meth)acrylate (A) and/or with the free isocyanate groups of component (B) and/or with the alkoxysilyl groups of the component (B).

As component (E) it is possible for example to use amino resins and/or epoxy resins. Those contemplated are the customary and known amino resins for example in WO 2014/016026 on pages 26 and 27.

In general such components (E) are used in fractions of up to 40 wt %, preferably of up to 30 wt %, more preferably of up to 25 wt %, very preferably of 0 to 15 wt %, based in each case on the binder content of the coating material composition of the invention.

Preference is given in accordance with the invention to using coating material compositions which comprise from 20.0 to 80.0 wt %, preferably from 30.0 to 70.0 wt %, based in each case on the binder content of the coating material composition, of at least one polyhydroxyl group-containing component (A), more particularly at least one polyhydroxyl group-containing polyacrylate (A) and/or at least one polyhydroxyl group-containing polymethacrylate (A).

Preference is given in accordance with the invention to using coating material compositions which contain from 80.0 to 20.0 wt %, preferably from 70.0 to 30.0 wt %, based in each case on the binder content of the coating material composition, of component (B).

The coating material compositions preferably comprise component (C) in a fraction of 0 to 20 wt %, more preferably of 0 to 10 wt %, very preferably of 1 to 5 wt %, based in each case on the binder content of the coating material composition.

The weight fractions of component (A), of the optionally employed component (C), and of component (B) are preferably selected such that the molar equivalents ratio of the hydroxyl groups of the polyhydroxyl group-containing components (A) plus optionally (C) to the isocyanate groups of component (B) is between 1:0.5 and 1:1.5, preferably between 1:0.8 and 1:1.2, more preferably between 1:0.9 and 1:1.1.

The polyhydroxyl group-containing component (A), the polyethoxyl component (C), and/or the isocyanate component (B) may be present in a suitable solvent. Suitable solvents (L) for the coating materials of the invention are especially those which in the coating material are chemically inert toward the components (A), (B), and optionally (C) and which also do not react with (A), optionally (C), and (B) during the curing of the coating material. Mention may be made in particular here of aprotic solvents. Examples of such aprotic solvents are aliphatic and/or aromatic hydrocarbons, ketones, esters, ethers, or mixtures of the aforementioned solvents. The aprotic solvents or solvent mixtures preferably have a water content of not more than 1 wt %, more preferably not more than 0.5 wt %, based on the solvent.

The solvent or solvents are used preferably in the coating material compositions of the invention in an amount such that the binder content of the coating material composition is at least 50 wt %, more preferably at least 60 wt %. It should be borne in mind here that generally speaking, as the solids content becomes higher, the viscosity of the coating material composition goes up, and the leveling of the coating material composition and therefore the overall visual impression conveyed by the cured coating become poorer.

The coating material compositions of the invention preferably further comprise at least one customary and known coatings additive (F), different from components (A), (B), (D), (Z), (R), optionally (C), and optionally (E), in effective amounts, i.e., in amounts preferably up to 20 wt %, more preferably of 0 up to 10 wt %, based in each case on the binder content of the coating material composition.

Examples of suitable coatings additives (F) are as follows:
radical scavengers;
slip additives;
polymerization inhibitors;
defoamers;
reactive diluents other than components (A) and (C), more particularly reactive diluents which become reactive only through reaction with other constituents and/or with water, such as Incozol or aspartic esters, for example;
wetting agents other than components (A) and (C), such as siloxanes, fluorine-containing compounds, carboxylic monoesters, phosphoric esters, polyacrylic acids and copolymers thereof, or polyurethanes;
adhesion promoters;
leveling agents;
rheological assistants, based for example on customary hydrophilic and/or hydrophobic fumed silica, such as various Aerosil® products, or customary urea-based rheological assistants;
film-forming assistants such as cellulose derivatives;
fillers such as, for example, nanoparticles based on silicon dioxide, aluminum oxide, or zirconium oxide; for further details, refer to Römpp Lexikon "Lacke und Druckfarben" Georg Thieme Verlag, Stuttgart, 1998, pages 250 to 252;
flame retardants.

Particularly preferred coating material compositions are those which comprise
30.0 to 70.0 wt %, based on the binder content of the coating material composition, of at least one polyhydroxyl group-containing polyacrylate (A) and/or at least one polyhydroxyl group-containing polymethacrylate (A) and/or at least one polyhydroxyl group-containing polyester polyol (A) and/or one polyhydroxyl group-containing polyurethane (A), 70.0 to 30.0 wt %, based on the binder content of the coating material composition, of at least one component (B), having on average at least one isocyanate group and having on average at least one hydrolyzable silane group,
0 to 10 wt %, based on the binder content of the coating material composition, of the at least one hydroxyl group-containing component (C),
0 up to 15 wt %, based on the binder content of the coating material composition, of at least one amino resin (E),
0.5 to 10 wt %, based on the binder content of the coating material composition of the invention, of at least one catalyst (D),
0.02 to 0.55 wt %, based on the binder content of the coating material composition of the invention, of at least one catalyst (Z),
0.1 to 5.0 wt %, based on the binder content of the coating material composition of the invention, of at least one accelerator (R), and
0 to 10 wt %, based on the binder content of the coating material composition, of at least one customary and known coatings additive (F).

More particularly, the inventively employed coating materials are transparent coating materials, preferably clearcoat materials. The inventively employed coating materials therefore contain no pigments, or comprise only organic transparent dyes or transparent pigments.

In a further embodiment of the invention, the inventively employed coating material composition may also comprise further pigments and/or fillers and may serve for producing pigmented topcoats and/or pigmented undercoats or primer-surfacers, more particularly pigmented topcoats. The pigments and/or fillers employed for these purposes are known to the skilled person. The pigments are customarily used in an amount such that the pigment-to-binder ratio is between 0.05:1 and 1.5:1, based in each case on the binder content of the coating material composition.

The transparent coating materials used with preference in accordance with the invention may be applied to pigmented basecoat materials. Preferably, the applied basecoat material is initially dried, meaning that at least part of the organic solvent and/or of the water is removed from the basecoat film in an evaporation phase. Drying takes place preferably at temperatures from room temperature to 80° C. After the drying, the transparent coating material composition is applied. Subsequently, the two-coat paint system is baked at temperatures of 20 to 200° C. for a time of 1 min up to 10 h, employing preferably lower temperatures, between 20 and 100° C., preferably between 30 and 90° C., and correspondingly longer curing times, of up to 60 min.

The invention accordingly also provides multicoat color and/or effect paint systems composed of at least one pigmented basecoat and at least one clearcoat arranged thereon, wherein the clearcoat has been produced from the coating material composition of the invention.

The basecoat materials are known to the skilled person. Not only water-thinable basecoat materials but also basecoat materials based on organic solvents can be used. These basecoat materials customarily comprise one or more binders, one or more pigments, optionally one or more crosslinking agents, one or more organic solvents, and customarily auxiliaries and adjuvants, and also, in the case of waterborne basecoat materials, water as additional solvent.

Suitable basecoat materials are described for example in EP-A-0 692 007 and in the documents recited therein in column 3, lines 50 ff.

Because the coatings of the invention produced from the coating materials of the invention also exhibit outstanding adhesion to already cured electrocoats, primer-surfacer coats, basecoats, or customarily and known clearcoats, they are outstanding suitable not only for use in automotive OEM finishing but also for automotive refinishing and/or for the coating of parts for installation in or on automobiles, and/or for the coating of commercial vehicles.

The application and curing of the coating material compositions take place in accordance with the customary and known methods, as described for example in WO 2014/016026 on pages 29 and 33.

The coating material compositions and paint systems, especially the clearcoat systems, are used more particularly in the technologically and esthetically particularly demanding field of automotive OEM finishing and for the coating of plastics parts for installation in or on automobile bodies, more particularly for top-class automobile bodies, such as, for example, for the production of roofs, trunk lids and tailgates, engine hoods, wheel arches, fenders, spoilers, sills, protective strips, side trim, and the like, and also for automotive refinishing and for commercial vehicles, such as, for example, of trucks, chain-driven construction vehicles, such as crane vehicles, wheel loaders, and concrete mixers, for example, buses, rail vehicles, watercraft, aircraft, and also agricultural equipment such as tractors and combine harvesters, and parts thereof.

The plastics parts consist customarily of ASA, polycarbonates, blends of ASA and polycarbonates, polypropylene, polymethyl methacrylates, or impact-modified polymethyl methacrylates, more particularly of blends of ASA and polycarbonates, preferably with a polycarbonate fraction >40%, more preferably >50%.

In a further preferred embodiment of the invention, the coating material composition of the invention is used as a transparent clearcoat material for the coating of plastics substrates, more particularly of plastics parts for installation in or on vehicles. The plastics parts for installation are preferably likewise coated in a multistage coating process, in which an optionally precoated substrate or a substrate pretreated for better adhesion of the subsequent coatings (e.g., flaming, corona or plasma treatment of the substrate) is coated first with a pigmented basecoat and thereafter with a coat of the coating material composition of the invention.

The present invention is now described in more detail using the examples below. All figures in these examples are weight figures, unless expressly indicated otherwise.

Preparation of a Polyacrylates Polyol (A1)

A steel reactor with monomer feed and initiator feed, thermometer, oil heating, and reflux condenser is charged with 26.63 g of Solventnaphtha® (commercially available aromatic solvent from DHC Solvent Chemic GmbH) and this initial charge is heated to 40° C. Then a mixture M1 consisting of 2.94 g of Solventnaphtha® and 1.54 g of di-tert-butyl peroxide is added dropwise with stirring. The metering rate is set such that the addition of the mixture M1 is over after 6.75 hours. 15 minutes after the start of the addition of the mixture M1, the mixture M2, consisting of 8.21 g of styrene, 20.2 g of tert-butyl acrylate, 12.62 g of butanediol monoacrylate, 8.84 g of n-butyl methacrylate, 12.64 g of hydroxyethyl acrylate, and 0.63 g of acrylic acid, is added dropwise. The metering rate is set so that the addition of the mixture M2 is over after 6 hours. When the addition of mixture M1 is over, the mixture is held at 140° C. for a further 2 hours and then cooled to below 100° C. The mixture is then diluted with 5.79 g of Solventnaphtha® (commercially available aromatic solvent mixture from DHC Solvent Chemic GmbH). The resulting solution of the polyacrylates polyol (A1) has a solids content of 65% (1 hour, 130° C. forced air oven), a viscosity of 18.5 dPas (ICI cone/plate viscometer 23° C.), an OH number of 175 mg KOH/g, and an acid number of 8-12 mg KOH/g.

Preparation of the Curing Agent Solution (B1)

A 250 ml three-neck flask with stirring magnetic, internal thermometer, and dropping funnel is charged with a mixture of 51.6 g of a trimerized isocyanurate based on hexamethyl-1,6-diisocyanate (Desmodur® N 3600, Bayer, Leverkusen) and 20.0 g of butyl acetate. With nitrogen blanketing, via the dropping funnel, a mixture of 26.4 g of bis[3-trimethoxysilylpropyl]amine (Dynasylan® 1124, EVONIK, Rheinfelden) and 2.0 g of N-[3-(trimethoxysilyl)propyl]butylamine (Dynasylan® 1189, EVONIK, Rheinfelden) is added slowly dropwise. The reaction is exothermic. The rate of addition is selected such that the internal temperature does not exceed a maximum level of 60° C. Thereafter, using the dropping funnel, a further 4 g of butyl acetate area added. The reaction mixture is held at 60° C. for four hours more until titrimetric determination of the isocyanate content (according to DIN EN ISO 11909) gives a constant value of 8.3-8.8% NCO, based on solids).

Preparation of the Catalyst (D)

A 100 ml three-neck flask equipped with reflux condenser and stirrer is charged under nitrogen blanketing with 11.78 g of DABCO (diazabicyclo[2.2.2]octane), 75.67 g of propanol, and 56.38 g of isobutanol. At about 45° C., 32.24 g of bis(2-ethylhexyl) phosphate are added slowly dropwise, during which the temperature is held at a maximum of 50° C. The mixture is stirred at 40° C. for 3 hours more. This gives a 25% strength solution of the catalyst (D).

Formulation of the Coating Materials of Inventive Examples 1 and 2 and of the Coating Materials of Comparative Examples V1 to V5 and Also of the Corresponding Coatings of Examples 1 and 2 and of Comparative Examples V1 to V5

To prepare the base varnishes (S1) and (S2) of the inventive examples and the base varnishes (VS1) to (VS5) of the comparative examples V1 to V5, the constituents indicated in table 1 are weighed out in the order indicated (beginning from the top) into a suitable vessel in that order and are stirred intimately with one another.

To prepare the coating materials (K1) and (K2) of inventive examples 1 and 2 and also the coating materials (VK1) to (VK5) of the comparative examples, the stated amounts of curing agent solution (B1) are added to the amount of base varnish indicated in table 1, in a suitable vessel, and these components are stirred intimately with one another.

TABLE 1 composition of base varnishes S1 and S2 and
also VS1 to VS5 and also of coating materials K1 and K2
and VK1 to VK5 in parts by weight

|  | V1 | V2 | V3 | V4 | 1 | 2 | V5 |
|---|---|---|---|---|---|---|---|
| Base varnish components | VS1 | VS2 | VS3 | VS4 | S1 | S2 | VS5 |
| Polyacrylate polyol (A1) | 49.7 | 49.7 | 49.7 | 49.7 | 49.7 | 49.7 | 49.7 |
| Tinuvin ® 292[1] | 1.0 | 1.0 | 1.0 | 1.0 | 1.0 | 1.0 | 1.0 |
| Tinuvin ® 384[2] | 1.1 | 1.1 | 1.1 | 1.1 | 1.1 | 1.1 | 1.1 |
| Butyl acetate | 44.7 | 44.7 | 44.7 | 44.7 | 44.7 | 44.7 | 44.7 |
| Catalyst (D) | 2.3 | 2.3 | 2.3 | 2.3 | 2.3 | 2.3 |  |
| Reaction accelerator (R)[3] |  |  |  | 1.0 |  | 1.0 |  |
| Coscat 83[4] |  | 0.1 |  |  | 0.1 | 0.1 |  |
| K-Kat XK-634[5] |  |  |  |  |  |  | 0.08 |
| Benzoic acid |  |  | 0.38 |  |  | 0.38 | 0.5 |
| Sum of base varnish components | 98.8 | 98.9 | 99.8 | 99.18 | 99.9 | 99.28 | 97.08 |
| Curing agent solution B | 50 | 50 | 50 | 50 | 50 | 50 | 50 |

Key to table 1:
[1] Tinuvin ® 292 = commercial light stabilizer from BASF SE, based on HALS
[2] Tinuvin ® 384 = commercial light stabilizer from BASF SE, based on a UV absorber
[3] Baysolvex D2EHPA = commercial bis(2-ethylhexyl) phosphate from Lanxess
[4] Coscat ® 83 = commercial catalyst from C. H. Erbsloh GmbH & Co. KG, based on bismuth trisneodecanoate
[5] K-Kat XK-634 = catalyst from King Industries, based on zinc carboxylate reactive with tetramethylguanidine Production of the Coatings of Examples 1 and 2 and of Comparative Example V1 to V5

Bonder panels coated with commercial, cured electrocoat are coated with commercial waterborne basecoat material (ColorBrite® from BASF Coatings GmbH) in black or, for the testing of the thermal yellowing, in white, and are each flashed at ambient temperature for 10 minutes and then dried at 80° C. for 10 minutes. The coating materials of examples 1 and 2 and of comparative examples V1 to V5 are subsequently applied, using a gravity-feed cup gun, and are baked together with the basecoat at 80° C. for 30 minutes. The film thickness of the clearcoat is 30 to 35 µm, that of the basecoat ~15 µm.

For the testing of the NCO conversion, the completed paint was applied directly to Stamylan panels without basecoat, so as to produce free films as needed for the measurements.

Determination of the Isocyanate Conversion

The NCO conversion is determined by subjecting the samples from table 1 to measurement by ATR-IR spectroscopy. For this purpose, the mixed wet specimens of the fresh components (i.e., base varnish plus curing agent) and the applied samples as well were each spectroscoped one and 24 hours after oven.

For calculation of conversion, the intensity of the isocyanate band at 2260 cm$^{-1}$ was employed, and its decrease in relation to the band of the fresh wet specimen was calculated. The spectra were standardized to the isocyanurate band at 1690 cm$^{-1}$, whose intensity is hardly influenced by the crosslinking reaction. The conversion figures are compiled in table 2.

Testing of the Thermal Yellowing

The coated panels on white basecoat, about 30 minutes after baking in the forced air oven, are subjected to measurement using the X-rite multi-angle spectrophotometer as hue measuring instrument, and a determination is made of the b* value in the L*a*b* color space (CIELAB system). The panels are then stored in a forced oven at 100° C. for 7 days. About 1 hour after the end of storage, the panels are again subjected to colorimetry, and the db value is determined. These results are found in table 2.

Testing of Micropenetration Hardness

The effect of the catalysts on the hardness of the clearcoat film was investigated by means of micropenetration hardness measurements (DIN EN ISO 14577-4 DE). The results are set out in table 2.

DMA Investigations, Film Properties

The storage moduli E'(200) and E'(min) and also the values for E''(max) and tan δ (max), which reflect a value for the glass transition temperature Tg, of the respective cured coating are measured by dynamic mechanical thermal analysis (DMTA) at a heating rate of 2 K/min with the DMTA V instrument from Rheometrics Scientific, with a frequency of 1 Hz and an amplitude of 0.2%. The DMTA measurements are carried out on free films having a layer thickness of 40 µm+/−10 µm. For this purpose, the coating material under test is applied to substrates (Stamylan panels). The resulting coating is cured at a panel temperature of 80° C. for 30 minutes and, after curing, is stored at 25° C. for 1 hour or 3 days, after which the DMTA measurements are carried out. The values ascertained from these measurements are set out in table 2.

DMA Investigations, Onset/Offset

The crosslinking onset temperature of the liquid coating materials is determined in the context of the invention experimentally by means of dynamic mechanical thermal analysis (DMTA). This method is described for example in DIN EN ISO 6721-1, the method in that standard being elucidated in the context of the determination of dynamic-mechanical properties of plastics. DMA uses an oscillating force applied to the sample for frequency-dependent and temperature-dependent capture of the viscoelastic properties (that is, the stiffness, expressed by the measured storage modulus E', and the dissipated work per vibration, expressed by the measured loss modulus (E'') of the sample. The stiffer the material, the greater the amount of the storage modulus, meaning that the material presents a greater resistance to its elastic deformation. For the purposes of the present invention, DMA is used to determine the storage modulus by exposing the sample to a sinusoidal vibration of constant amplitude and frequency while continuously raising the temperature. For the purposes of the present invention, the temperature at which the storage modulus begins to rise is referred to as the crosslinking onset temperature of the samples. The measurements were carried out using a Triton 2000B instrument from Triton Technology. 1 g of each of examples VB1-VB4 and B1 and B2 for measurement is applied to a glass fiber mesh which is clamped into the instrument, and the storage modulus E' is measured with sinusoidual sample loading (constant frequency, constant amplitude in the linear measurement range) for a continuous temperature increase of 2° C. per minute. Measurement takes place in a temperature range which is relevant for the sample (here: from 2° C. to 200° C.). The crosslinking onset temperature is then determined graphically from the storage modulus/temperature diagram, and is the temperature of the point of intersection of the extrapolated baseline of the storage modulus before the onset of crosslinking, and the extrapolated straight line arising from the quasi-linear ascent range of the storage modulus after the onset of crosslinking. In this way, the crosslinking onset temperature can be determined to a precision of +/−2° C.

Measurement of the Chemical Resistance

The chemical resistance of the coating samples was carried out 7 days after baking of the coating materials. The tests took place under standard conditions in accordance with DIN EN ISO 3270.

A metal test plate with dimensions of 100 mm×570 mm is used. Depending on the test medium, 45 or 23 drops in the longitudinal direction, i.e., 1 drop per heating segment, are applied to the metal test panel prior to temperature exposure, within a maximum of 10 minutes, using an automatic pipetting system or by hand using a micropipette. The tests take place in a gradient oven at a linear temperature gradient of 35° C. to 78° C. with tolerance of ±1° C. per heating segment. The test duration in the gradient oven is 30 minutes. After the test has been carried out, the metal sample panel is washed off first with lukewarm water and subsequently with DI water, and then cleaned using isohexane and a microfiber cloth. As test media are used the following two chemicals:

| Chemical | Concentration | Test quantity | Heating segments |
|---|---|---|---|
| Hydrochloric acid p.A. | c(HCl) = 10.0% | 25 µl | 1 segment |
| Sodium hydroxide solution p.A. | c(NaOH) = 5.0% | 25 µl | 1 segment |

Table 2 lists the temperatures from which a change became apparent in the coating surface.

Determination of the Scratch Resistance

The scratch resistance of the surfaces of the resulting coatings was carried out using the Hammer test (50 back-and-forth strokes with steel wool (RAKSO®00 (fine)) and an applied weight of 1 kg, using a hammer. Subsequently the residue gloss at 20° is determined with a commercial gloss instrument. Results of the testing are found in table 2.

Measurement of Köig Pendulum Hardness

The König pendulum hardness is determined in analogy to DIN En ISO 1522 DE, the results being found in table 2.

TABLE 2 test results of the coatings of examples 1 and 2 and of comparative examples V1 to V5

|  | V1 | V2 | V3 | V4 | 1 | 2 | V5 |
|---|---|---|---|---|---|---|---|
| NCO conversion/% after 1 h | 23 | 67 | 14 | 25 | 43 | 74 |  |
| NCO conversion/% after 24 h | 48 | 77 | 40 | 52 | 60 | 85 |  |
| Micro-penetration hardness 25.6 mN [N/mm$^2$] 0.25 h | 3.12 | 4.58 | 6.57 | 3.62 | 14.21 | 7.13 |  |
| Micro-penetration hardness 25.6 mN [N/mm$^2$] 1 d | 7.1 | 9.1 | 31.5 | 11.08 | 31.1 | 14.38 |  |
| Micro-penetration hardness 25.6 mN [N/mm$^2$] 3 d | 14.15 | 12.34 | 50.64 | 27.71 | 33.5 | 22.49 |  |
| Average penetration depth/µm 0.25 h | 17.19 | 14.26 | 11.95 | 15.99 | 8.17 | 11.49 |  |
| Average penetration depth/µm 1 d | 11.49 | 10.21 | 5.53 | 9.27 | 5.56 | 8.18 |  |

TABLE 2-continued test results of the coatings of examples 1 and 2 and of comparative examples V1 to V5

| | V1 | V2 | V3 | V4 | 1 | 2 | V5 |
|---|---|---|---|---|---|---|---|
| Average penetration depth/μm | 8.19 | 8.85 | 4.36 | 6.73 | 5.35 | 6.61 | |
| 3 d König pendulum hardness/ number of strokes | 10 | 19 | 19 | 11 | 29 | 22 | |
| 0.25 h König pendulum hardness/ number of strokes | 10 | 19 | 20 | 12 | 29 | 22 | |
| 1 h König pendulum hardness/ number of strokes | 10 | 19 | 20 | 12 | 29 | 22 | |
| 2 h König pendulum hardness/ number of strokes | 12 | 21 | 22 | 14 | 29 | 24 | |
| 6 h König pendulum hardness/ number of strokes | 19 | 25 | 34 | 24 | 35 | 30 | |
| 1 d Gradient oven hydrochloric acid | <36° C. | 53° C. | 39° C. | 53° C. | 56° C. | 50° C. | |
| Gradient oven sodium hydroxide solution | <36° C. | <36° C. | <36° C. | <36° C. | 40° C. | 40° C. | |
| Thermal yellowing db value | 0.43 | 0.49 | 0.46 | 0.45 | 0.49 | 0.49 | 0.84 |
| E″max 1 h | 13° C. | 30° C. | 17° C. | 22° C. | 35° C. | 39° C. | |
| E″max 3 d | 44° C. | 44° C. | 52° C. | 50° C. | 60° C. | 48° C. | |
| tanδ max 1 h | 35° C. | 46° C. | 43° C. | 44° C. | 51° C. | 54° C. | |
| tanδ max 3 d | 58° C. | 57° C. | 66° C. | 63° C. | 74° C. | 59° C. | |
| E'min 1 h/ $10^7$ Pa | 1.7 | 1.7 | 2.9 | 2.4 | 3.2 | 2.8 | |
| E'min 3 d/ $10^7$ Pa | 2.8 | 2.1 | 4.0 | 3.5 | 4.9 | 2.9 | |
| E'200° C./E' min 1 h | 4.2 | 3.3 | 2.4 | 3.1 | 1.6 | 2.2 | |
| E'200° C./E' min 3 d | 2.4 | 2.4 | 1.5 | 1.9 | 1.4 | 2.0 | |
| Onset temperature/ ° C. | 63 | 46 | 53 | 59 | 43 | 43 | |
| Offset time/min | 22 | 21 | 16 | 19 | 14 | 14 | |
| Hammer test 50 back-and-forth strokes/ residual gloss % | 44 | 60 | 92 | 60 | 84 | 54 | |

Discussion of the Test Results:

The comparison of comparative example V1 (only DABCO-blocked phosphoric acid partial ester (D)) with comparative example V2 (DABCO-blocked phosphoric acid partial ester (D) plus bismuth carboxylate (Z)) shows, as does the comparison of example 1 (combination of DABCO-block phosphoric acid partial ester (D), bismuth carboxylate (Z), and phosphoric acid partial ester (R)) both with comparative example V1 (only DABCO-blocked phosphoric acid partial ester (D)) and with comparative example V3 (DABCO-blocked phosphoric acid partial ester (D) plus phosphoric acid partial ester (R)), that the addition of the bismuth carboxylate (Z) significantly increases the isocyanate conversion, with the increase in the isocyanate conversion coming out substantially higher through the addition of the bismuth carboxylate (Z) in comparative example V2 without the addition of the reaction accelerator (R) based on phosphoric acid partial ester, than for simultaneous addition of the bismuth carboxylate (Z) and of the reaction accelerator (R) based on phosphoric acid partial ester, as in inventive example 1.

In spite of this lower isocyanate conversion in inventive example 1 in comparison to the isocyanate conversion of comparative example V2, however, the inventive coating of example 1, relative not only to comparative example V1 but also to comparative example V2 and to comparative example V3, exhibits a very significantly improved micropenetration hardness, a very significantly improved average penetration depth, and a significantly improved resistance toward sodium hydroxide solution. The addition of the reaction accelerator (R) produces a significantly improved silane crosslinking, as shown by the comparison of comparative examples V1 and V2 with inventive example 1.

Furthermore, the comparison of example 1 (combination of DABCO-blocked phosphoric acid partial ester (D), bismuth carboxylate (Z), and phosphoric acid partial ester (R)) with comparative example V1 (only DABCO-blocked phosphoric acid partial ester (D)) and with comparative example V2 (DABCO-blocked phosphoric acid partial ester (D) plus bismuth carboxylate (Z)) shows that through the addition of bismuth carboxylate (Z), additionally, the start of crosslinking (that is, the onset temperature) begins at significantly lower temperatures of 46° C. in comparative example V2 and of only in fact 43° C. in inventive examples 1 and 2 than without the addition of the bismuth carboxylate (Z) in comparative example V1 with an onset temperature of 66° C. and in comparative example V3 (DABCO-blocked phosphoric acid partial ester (D) and phosphoric acid partial ester (R)) with onset temperature of 63° C.

While in comparative example V3, as a result of the addition of the reaction accelerator (R), there is a slight reduction likewise in the onset temperature, with a value of 53° C., in comparison to comparative example V1, with a value of 63° C., the onset temperature is nevertheless significantly higher than in inventive examples 1 and 2, with an onset temperature of only 43° C. At the same time, however, the OH/NCO conversion in comparative example V3 is by far the lowest, and is indeed lowered even further in comparison with comparative example V1. This means that in comparative example V3, the addition of the reaction accelerator (R) actually inhibits the OH/NCO reaction.

Moreover, the pendulum hardness, measured in each case after 0.25 h, 1 h, 2 h, and after 6 h, of the resulting coatings of the inventive examples 1 and 2 is substantially higher than that of the resulting coatings of all comparative examples V1 to V4.

Lastly, surprisingly, the chemical resistance with respect to sodium hydroxide solution of the resulting coatings of inventive examples 1 and 2 is higher than that of the resulting coatings of all comparative examples V1 to V4, and the chemical resistance toward hydrochloric acid of the resulting coatings of inventive examples 1 and 2 is higher than that of the resulting coatings of comparative examples V1 and V3. Hence the more the reaction accelerator (R) improves the silane crosslinking, the more the OH/NCO reaction is inhibited at the same time. This makes it clear that the various catalysts (D) and (Z) and also the reaction accelerator (R) all influence one another and that only in accordance with the invention has a balanced mixture been found that results both in very good silane crosslinking and in very good OH/NCO conversion and hence ensures the outstanding level of properties of the inventive coating even when the coating is cured at moderate temperatures of not more than 90° C.

No further investigation was carried out of the resulting coating of comparative example 5, since the thermal yellowing was at an unacceptably high level.

What is claimed is:

1. A coating material composition, comprising:
   (A) at least one polyhydroxyl group-containing component (A);
   (B) at least one component (B) having on average at least one isocyanate group and having on average at least one of
   at least one hydrolyzable silane group of the formula (I):

   $$-NR-(X-SiR''_x(OR')_{3-x}) \quad \text{(I), and}$$

at least one hydrolyzable silane group of the formula (II):

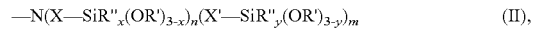
   $$-N(X-SiR''_x(OR')_{3-x})_n(X'-SiR''_y(OR')_{3-y})_m \quad \text{(II)},$$

(D) at least one phosphorus and nitrogen-containing catalyst (D) for crosslinking of silane groups; and
   (Z) at least one catalyst (Z) for reaction of hydroxyl groups with isocyanate groups,
   wherein:
   R represents hydrogen, alkyl, cycloalkyl, aryl, or aralkyl, it being possible for the carbon chain to be interrupted by nonadjacent oxygen, sulfur, or NRa groups, where Ra=alkyl, cycloalkyl, aryl, or aralkyl;
   R' represents hydrogen, alkyl, or cycloalkyl, it being possible for the carbon chain to be interrupted by nonadjacent oxygen, sulfur, or NRb groups with Rb=alkyl, cycloalkyl, aryl, or aralkyl;
   X, X' independently represent linear and/or branched alkylene or cycloalkylene radical having 1 to 20 carbon atoms;
   R" represents alkyl, cycloalkyl, aryl, or aralkyl, it being possible for the carbon chain to be interrupted by nonadjacent oxygen, sulfur, or NRc groups, with NRc=alkyl, cycloalkyl, aryl, or aralkyl;
   n represents 0 to 2;
   m represents 0 to 2;
   m+n represents 2;
   x, y represents 0 to 2;
   the catalyst (Z) is selected from the group consisting of:
   zinc carboxylates, bismuth carboxylates, and mixtures thereof,
   aluminum chelates, zirconium chelates, titanium chelates, boron chelates, and mixtures thereof,
   inorganic, tin-containing catalysts, and
   mixtures thereof; and
   the coating material composition comprises at least one reaction accelerator (R) which is selected from the group consisting of inorganic acids, organic acids, partial esters of the inorganic acids, partial esters of the organic acids, and mixtures thereof.

2. The coating material composition as claimed in claim 1, comprising at least one component (B) having on average at least one hydrolyzable silane group of the formula (I) and at least one hydroylzable silane group of the formula (II).

3. The coating material composition as claimed in claim 1, wherein the phosphorus- and nitrogen-containing catalyst (D) is selected from the group consisting of amine adducts of optionally substituted acyclic phosphoric monoesters, amine adducts of optionally substituted cyclic phosphoric monoesters, amine adducts of optionally substituted acyclic phosphoric diesters, amine adducts of optionally substituted cyclic phosphoric ciesters, amine adducts of acyclic phosphonic diesters, amine adducts of cyclic phosphoric diesters, amine adducts of acyclic diphosphonic diesters, amine adducts of cyclic phosphonic diesters, and mixtures thereof.

4. The coating material composition as claimed in claim 1, wherein the catalyst (Z) is selected from the group consisting of zinc carboxylates and bismuth carboxylates.

5. The coating material composition as claimed in claim 1, wherein the reaction accelerator (R) is selected from the group consisting of alkylphosphonic acids, dialkylphosphinic acids, phosphonic acid, diphosphonic acid, phosphinic acid, optionally substituted acyclic phosphonic monoesters, optionally substituted cyclic phosphoric monoesters, optionally substituted acyclic phosphoric diesters, optionally substituted cyclic phosphoric diesters, and mixtures thereof.

6. The coating material composition as claimed in claim 1, wherein the reaction accelerator (R) is selected from the group consisting of optionally substituted acyclic phosphoric monoesters, optionally substituted cyclic phosphoric monoesters, optionally substituted acyclic phosphoric diesters, optionally substituted cyclic phosphoric diesters, and mixtures thereof.

7. The coating material composition as claimed in claim 1, wherein:
the phosphorus- and nitrogen-containing catalyst (D) is at least one adduct of diazabicyclo[2.2.2]octane, dimethyldodecylamine, triethylamine, or a mixture thereof, with acyclic phosphoric monoesters, cyclic phosphoric monoesters, acyclic phosphoric diesters, cyclic phosphoric diesters, or a mixture thereof;
the catalyst (Z) is a Bi(III) salts of at least one branched C3 to C24 fatty acid; and
the reaction accelerator (R) is an acyclic phosphoric diester, a cyclic phosphoric diester, or a mixtures thereof.

8. The coating material composition as claimed in claim 1, wherein a total amount of the catalyst (D) plus the catalyst (Z) plus the accelerator (R) ranges from 0.2 to 21 wt %, based on the binder content of the coating material composition.

9. The coating material composition as claimed in claim 1, comprising:
the catalyst (D) in fractions of 0.1 to 15 wt %;
the catalyst (Z) in fractions of 0.005 to 1.0 wt %; and
optionally the reaction accelerator (R) in fractions of 0.05 to 10.0 wt %, based in each case on the binder content of the coating material composition.

10. The coating material composition as claimed in claim 1, wherein 5 to 75 mol of isocyanate groups originally present in the component (B) have undergone conversion to silane groups of the formula (I), the formula (II), or both.

11. The coating material composition as claimed in claim 1, wherein 5 to 55 mol % of isocyanate groups originally present in the component (B) have undergone conversion to silane groups of the formula (II).

12. The coating material composition as claimed in claim 1, comprising: from 20.0 to 80.0 wt %, of the at least one hydroxyl-containing polyacrylate (A); and
from 20.0 to 80.0 wt of the component (B),
based on the binder content of the coating material composition.

13. A multistage coating process, comprising applying a pigmented basecoat to an optionally precoated substrate and thereafter applying a coat of the coating material composition of claim 1.

14. The multistage coating process as claimed in claim 13, wherein following application of the pigmented basecoat, the applied basecoat material is first dried at temperatures from room temperature to 80° C. and, following the application of the coating material composition, it is cured at temperatures between 20 and 100° C.

15. A clearcoat material, comprising the coating material composition of claim 1.

16. A multicoat effect and/or color paint system, comprising at least one pigmented basecoat and at least one clearcoat disposed thereon, wherein the clearcoat has been produced from a coating material composition of claim 1.

* * * * *

UNITED STATES PATENT AND TRADEMARK OFFICE
CERTIFICATE OF CORRECTION

Page 1 of 1

PATENT NO. : 10,781,338 B2
APPLICATION NO. : 15/736580
DATED : September 22, 2020
INVENTOR(S) : Jens Wegner et al.

It is certified that error appears in the above-identified patent and that said Letters Patent is hereby corrected as shown below:

On the Title Page

Item (51), under "Int. Cl.", Lines 1-2,
"*C09D 175/14*   (2006.01)
*C08G 18/18*    (2006.01)" should read -- *C09D 175/14*  (2006.01) --

Column 2, item (57), under "ABSTRACT", Line 8, "nitrogencontaining" should read -- nitrogen-containing --

Page 2, Column 1, item (56), under "OTHER PUBLICATIONS", Line 1, "al."Chapter" should read -- al., "Chapter --

In the Specification

Column 2, Line 4, "ioscyanate" should read -- isocyanate --

Column 4, Line 43, "15 milligrams," should read -- milligrams, --

Column 10, Line 27, "N-(4-(trimethoxysil-yl)butyl)" should read -- N-(4-(trimethoxysilyl)butyl) --

Column 19, Line 47, "Erbsloh" should read -- Erbslöh --

Column 22, Line 27, "Köig" should read -- König --

In the Claims

Column 27, Claim 2, Line 7, "hydroylzable" should read -- hydrolyzable --

Column 27, Claim 3, Line 15, "ciesters," should read -- diesters, --

Signed and Sealed this
Ninth Day of March, 2021

Drew Hirshfeld
*Performing the Functions and Duties of the
Under Secretary of Commerce for Intellectual Property and
Director of the United States Patent and Trademark Office*